United States Patent
Nagayama

(10) Patent No.: US 9,840,177 B2
(45) Date of Patent: Dec. 12, 2017

(54) ASSIST GRIP

(71) Applicant: NIFCO INC., Yokosuka-shi, Kanagawa (JP)

(72) Inventor: Tomoaki Nagayama, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/032,887

(22) PCT Filed: Oct. 27, 2014

(86) PCT No.: PCT/JP2014/078515
§ 371 (c)(1),
(2) Date: Apr. 28, 2016

(87) PCT Pub. No.: WO2015/064544
PCT Pub. Date: May 7, 2015

(65) Prior Publication Data
US 2016/0236602 A1 Aug. 18, 2016

(30) Foreign Application Priority Data
Oct. 28, 2013 (JP) .................. 2013-223721

(51) Int. Cl.
*B60N 3/02* (2006.01)
(52) U.S. Cl.
CPC ............. *B60N 3/026* (2013.01); *B60N 3/023* (2013.01); *Y10T 16/515* (2015.01)
(58) Field of Classification Search
CPC .......... B60N 3/02; B60N 3/026; B60N 3/023; B65D 25/2835
See application file for complete search history.

(56) References Cited

U.S. PATENT DOCUMENTS 6,467,130 B2 * 10/2002 Kurachi ................. B60N 3/023 16/418
7,103,939 B2 * 9/2006 Belchine, III ......... B60N 3/023 16/412

(Continued)

FOREIGN PATENT DOCUMENTS

DE 29712357 U1 9/1997
EP 1498307 A2 1/2005

(Continued)

OTHER PUBLICATIONS

PCT International Search Report of PCT/JP2014/078515.
Europe Patent Office, "Search Report for European Patent Application No. 14858330.5," dated May 15, 2017.

*Primary Examiner* — Jeffrey O Brien
(74) *Attorney, Agent, or Firm* — Manabu Kanesaka

(57) ABSTRACT

An assist grip attached to an inside of a vehicle cabin of an automobile is provided with a grip main member including a pair of concave portions formed at both ends in a longitudinal direction, and a pair of groove portions formed at sections opposing in the longitudinal direction on respective peripheral walls of the concave portions; a hinge including a pair of upright portions housed in the concave portions, and separated by a predetermined interval, and a pair of round boss portions protruding from both outer sides of the upright portions, and formed to respectively pass through the pair of groove portions; a bearing concave portion provided in one groove portion and into which the round boss portion is inserted; and a stopper member preventing a disconnection from a state of rotational shaft insertion wherein the round boss portion is inserted into the bearing concave portion.

6 Claims, 4 Drawing Sheets

(56) References Cited

U.S. PATENT DOCUMENTS

| | | | |
|---|---|---|---|
| 7,617,571 B2* | 11/2009 | Lee | B60N 3/023 16/412 |
| 8,661,622 B2* | 3/2014 | Takai | B60N 3/023 16/438 |
| 8,875,352 B2* | 11/2014 | Seto | B60N 3/023 16/438 |
| 2005/0028323 A1 | 2/2005 | Meyer et al. | |
| 2005/0091798 A1* | 5/2005 | Belchine, III | B60N 3/023 16/412 |
| 2012/0222360 A1* | 9/2012 | Schryer | B60N 3/026 49/460 |
| 2015/0102620 A1* | 4/2015 | Ichioka | F16F 9/12 296/1.02 |
| 2016/0214520 A1* | 7/2016 | Kajio | B60N 3/023 |
| 2016/0297340 A1* | 10/2016 | Yang | B60N 3/026 |

FOREIGN PATENT DOCUMENTS

| | | |
|---|---|---|
| JP | 2003-276492 A | 9/2003 |
| JP | 2010-116031 A | 5/2010 |
| JP | 2013-23073 A | 2/2013 |

* cited by examiner

ASSIST GRIP

CROSS-REFERENCES TO RELATED APPLICATIONS

The present application is National Phase of International Application No. PCT/JP2014/0778515, and claims priority from Japanese Patent Application No. 2013-223721 filed on Oct. 28, 2013, the disclosure of which is incorporated by reference herein in its entirety.

FIELD OF TECHNOLOGY

The present invention relates to an assist grip provided inside a vehicle cabin of an automobile for gripping when an occupant gets on and off, or the automobile jolts, or the like, and especially, a technology which can easily attach and detach the assist grip, and reliably fix the assist grip.

BACKGROUND ART

The assist grip is provided inside the vehicle cabin of the automobile for allowing the occupant to easily get in and out of the vehicle cabin of the automobile. By gripping the assist grip, the occupant can support himself or herself while the occupant gets in and out of the vehicle cabin, or while the occupant sits down on a seat. The assist grip is a component turning from a housing position to an open position, and similarly, from the open position to the housing position. In the housing position, the assist grip can be detached and attached from a position on an occupant side (for example, see Patent Document 1).

In the assist grip, there is provided a concave portion on both sides in a longitudinal direction of a grip main member, and a hinge member attached to a wall face of the vehicle cabin is inserted into the concave portion so as to be assembled. In the hinge member, there is provided a pair of upright portions, and a turning shaft provided outside the upright portions is inserted into a grip-bearing concave portion by a guide groove inside the concave portion of the grip so as to be retained by providing a damper inside the upright portion.

PRIOR ART DOCUMENT

Patent Document

Patent Document 1: Japanese Unexamined Patent Application Publication No. 2005-138823

SUMMARY OF THE INVENTION

Problems to be Solved by the Invention

In the aforementioned assist grip, there are the following problems. Namely, in order to insert the turning shaft of the hinge member into the grip-bearing concave portion from the guide groove, the upright portion has to be bent, so that an insertion operation is difficult. Also, in order to be bent, the upright portion is made thin and the like so as to have a possibility that the upright portion lacks rigidity as well. Moreover, in a case wherein the damper is not provided, there is a case wherein a separate component is required for retaining.

Therefore, an object of the present invention is to provide an assist grip wherein the insertion operation of the hinge member into the grip main member can be easily carried out, and which can be reliably fixed.

Means for Solving the Problems

In order to obtain the aforementioned objects, in the present invention, an assist grip attached to an inside of a vehicle cabin of an automobile comprises a grip main member including a pair of concave portions formed on both ends in a longitudinal direction, and a pair of groove portions formed at sections opposing in the longitudinal direction on respective peripheral walls of the concave portions; a hinge including a pair of upright portions housed in the concave portions and separated by a predetermined interval, and a pair of turning shafts protruding from both outer sides of the upright portions, and formed in such a way as to be respectively pass through the pair of groove portions; a bearing concave portion provided in one of the pair of groove portions, and into which one end of the pair of turning shafts is inserted into a terminal portion of the one groove portion; and a stopper member preventing a disconnection from a state of rotational shaft insertion wherein one end of the turning shaft is inserted into the bearing concave portion.

Effect of the Invention

According to the present invention, an insertion operation of a hinge member into the grip main member can be easily carried out, and reliably fixed.

BEST MODES OF CARRYING OUT THE INVENTION

Figure 1:
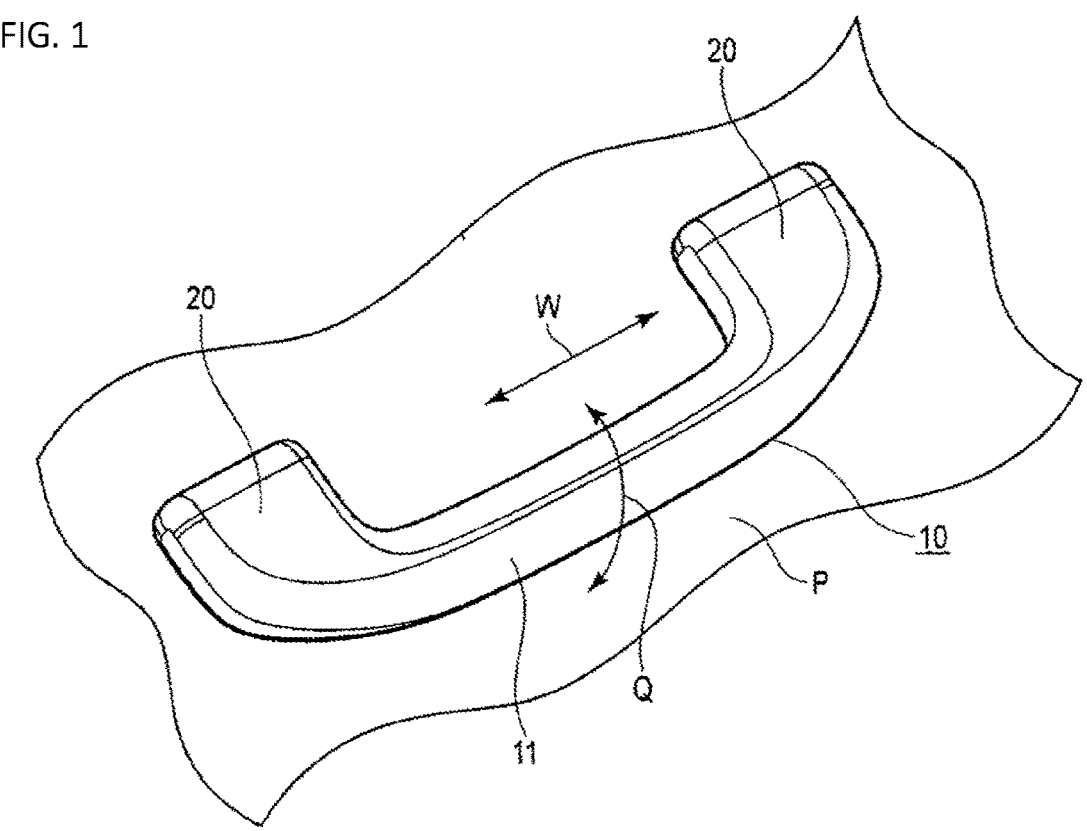
FIG. 1 is a perspective view showing an assist grip according to one embodiment of the present invention.
Figure 2:
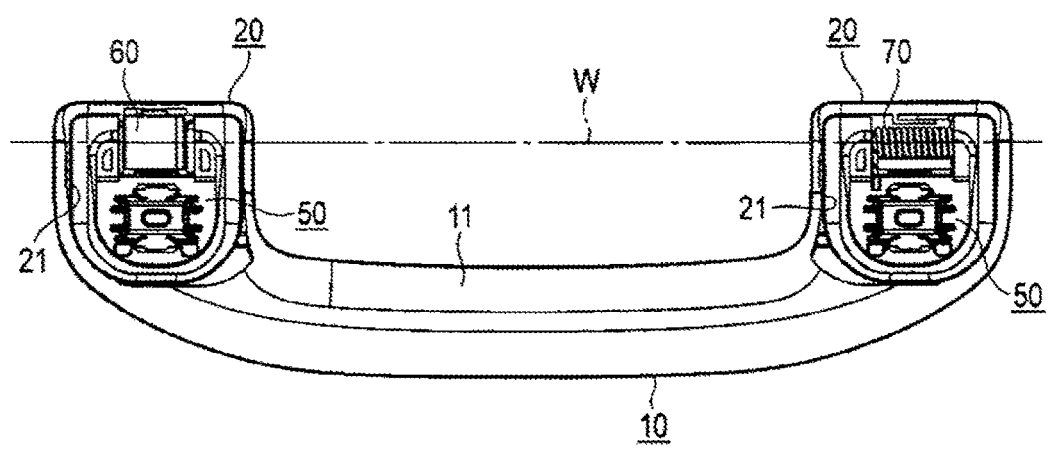
FIG. 2 is a plan view showing the assist grip.
Figure 3:
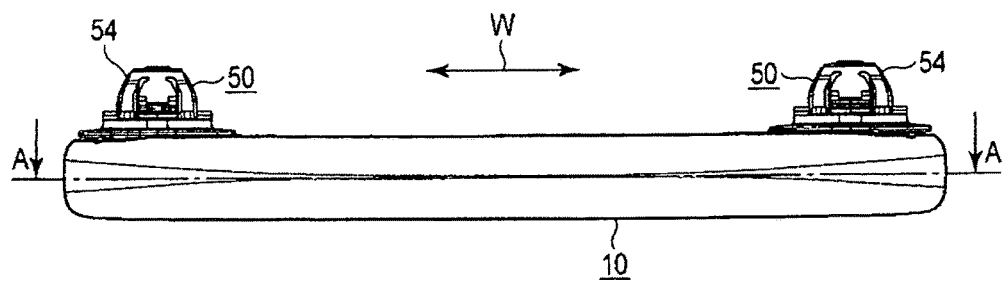
FIG. 3 is a side view showing the assist grip.
Figure 4:
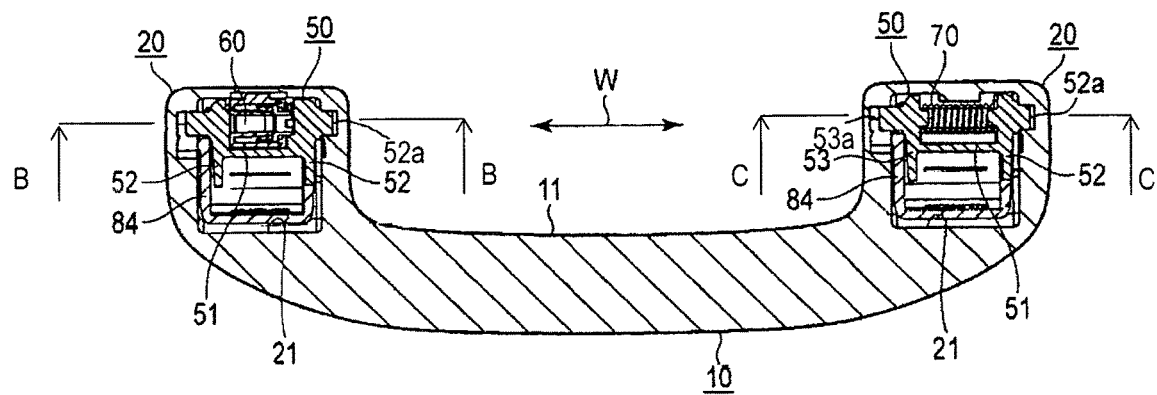
FIG. 4 is a cross-sectional view taken along a line A-A in FIG. 3, wherein the assist grip is viewed in an arrow direction.
Figure 5:
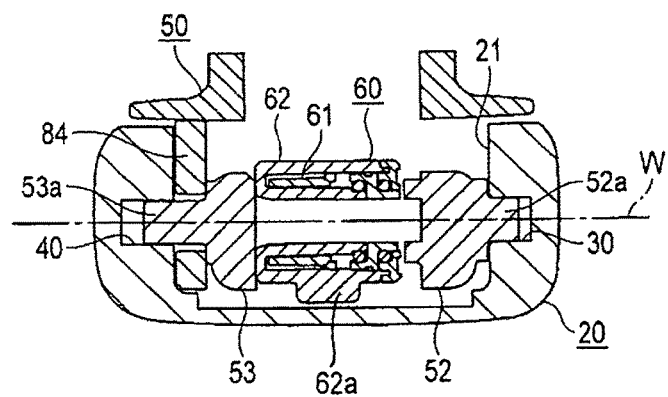
FIG. 5 is a cross-sectional view taken along a line B-B in FIG. 4, wherein the assist grip is viewed in the arrow direction.
Figure 6:
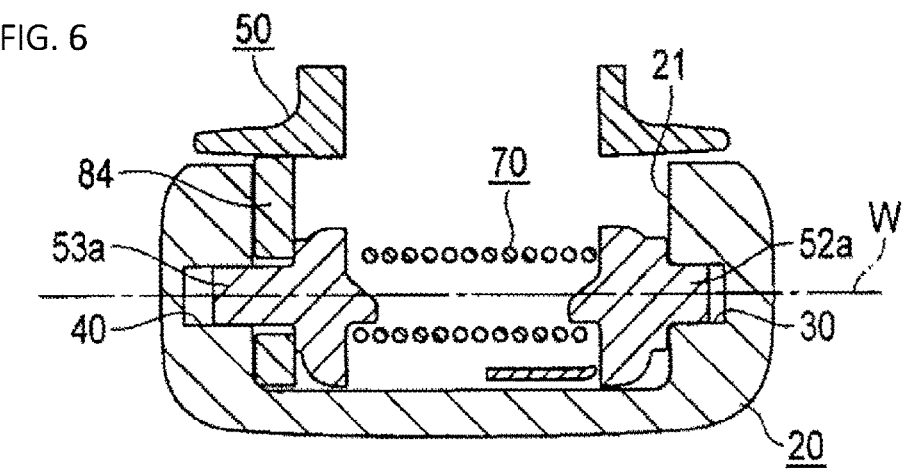
FIG. 6 is a cross-sectional view taken along a line C-C in FIG. 4, wherein the assist grip is viewed in the arrow direction.
Figure 7:
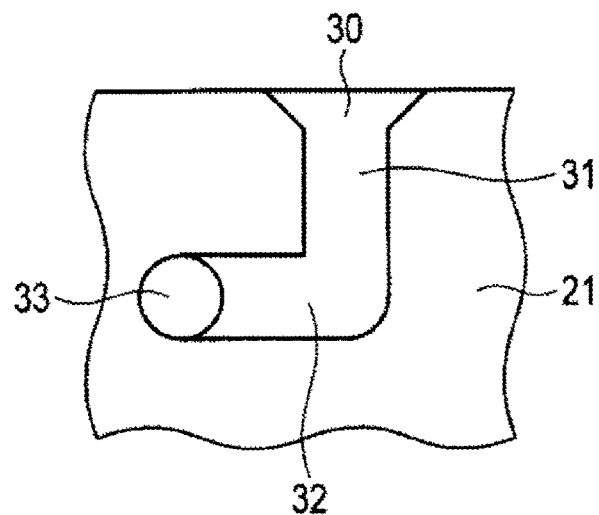
FIG. 7 is a front view showing one groove portion in a concave portion of the assist grip.
Figure 8:
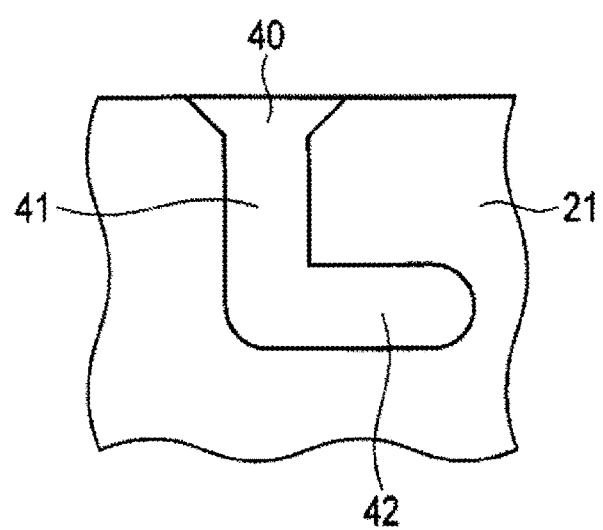
FIG. 8 is a front view showing the other groove portion in the concave portion of the assist grip.

FIG. 1 is a perspective view showing an assist grip 10 according to one embodiment of the present invention; FIG. 2 is a plan view showing the assist grip 10; FIG. 3 is a side view showing the assist grip 10; FIG. 4 is a cross-sectional view taken along a line A-A in FIG. 3, wherein the assist grip 10 is viewed in an arrow direction; FIG. 5 is a cross-sectional view taken along a line B-B in FIG. 4, wherein the assist grip 10 is viewed in the arrow direction; FIG. 6 is a cross-sectional view taken along a line C-C in FIG. 4, wherein the assist grip 10 is viewed in the arrow direction; FIG. 7 is a front view showing one groove portion in a concave portion of the assist grip 10; and FIG. 8 is a front view showing the other groove portion in the concave portion of the assist grip 10. Also, the reference alphabet P in FIG. 1 represents a vehicle cabin, and the reference alphabet W represents a longitudinal direction.

The assist grip 10 is provided inside the vehicle cabin P of an automobile for allowing an occupant to easily get in and out of the vehicle cabin P of the automobile. By gripping the assist grip 10, the occupant can support himself or herself while the occupant gets in and out of the vehicle cabin P, or while the occupant sits down on a seat. As shown with an arrow Q in FIG. 1, the assist grip 10 can turn from a housing position to an open position, and similarly, from the open position to the housing position. In the housing position, the assist grip 10 can be detached and attached from a position on an occupant side.

The assist grip 10 includes a handle main member 11 having a bar shape which can be easily gripped by the occupant. The handle main member 11 is provided with a pair of attachment portions 20 on both ends in the longitudinal direction W thereof. In one attachment portion 20, there is formed a concave portion 21 (see FIGS. 5 and 6), and in an inner wall (peripheral wall) of the concave portion 21, there is provided a pair of groove portions 30 and 40 at positions opposing in the longitudinal direction W (see FIGS. 7 and 8). The pair of groove portions 30 and 40 has different structures as described hereinafter, and even in the other attachment portion 20, there is disposed a pair of groove portions 30 and 40 having the same structure on the same side in the longitudinal direction W. In the concave portion 21, there is detachably provided a hinge 50.

As shown in FIG. 7, the groove portion 30 is provided with a first groove 31 extending in an insertion direction; a second groove 32 bending at a right angle from a terminal of the first groove 31; and a bearing concave portion 33 provided at a terminal of the second groove 32. The first groove 31 and the second groove 32 are relatively shallowly formed to guide a round boss portion 52a. The bearing concave portion 33 is formed deeply compared to the first groove 31 and the second groove 32. The bearing concave portion 33 pivotally supports the later-described round boss portion 52a.

As shown in FIG. 8, the groove portion 40 is provided with a first groove 41 extending in an insertion direction; and a second groove 42 bending at a right angle from a terminal of the first groove 41. The first groove 41 and the second groove 42 are formed deeply compared to the first groove 31 and the second groove 32 to guide a round boss portion 53a. The second groove 42 pivotally supports the later-described round boss portion 53a.

The hinge 50 is provided with a hinge main member 51 protruding and entering with respect to the concave portion 21 by turning; plate-like upright portions 52 and 53 provided on both ends in the longitudinal direction W of the hinge main member 51; the round boss portions (turning shafts) 52a and 53a projected from the upright portions 52 and 53 in the longitudinal direction W; and an engagement portion 54 attached to the vehicle cabin P. Also, between the respective upright portions 52 and 53, there is disposed a cylindrical damper 60 coaxially with the round boss portions 52a and 53a. The damper 60 is provided with an inner cylinder portion 61 fixed to the upright portions 52 and 53; and an outer cylinder portion 62 disposed on an outer periphery of the inner cylinder portion 61 to viscously turn. The damper 60 has a desirable braking effect for controlling a repulsion speed and a repulsion force in a turning direction Q of the assist grip 10.

Incidentally, in the other concave portion 21, there is disposed a coil spring 70. The coil spring 70 urges the assist grip 10 in a direction of returning to the housing position.

Figure 9:
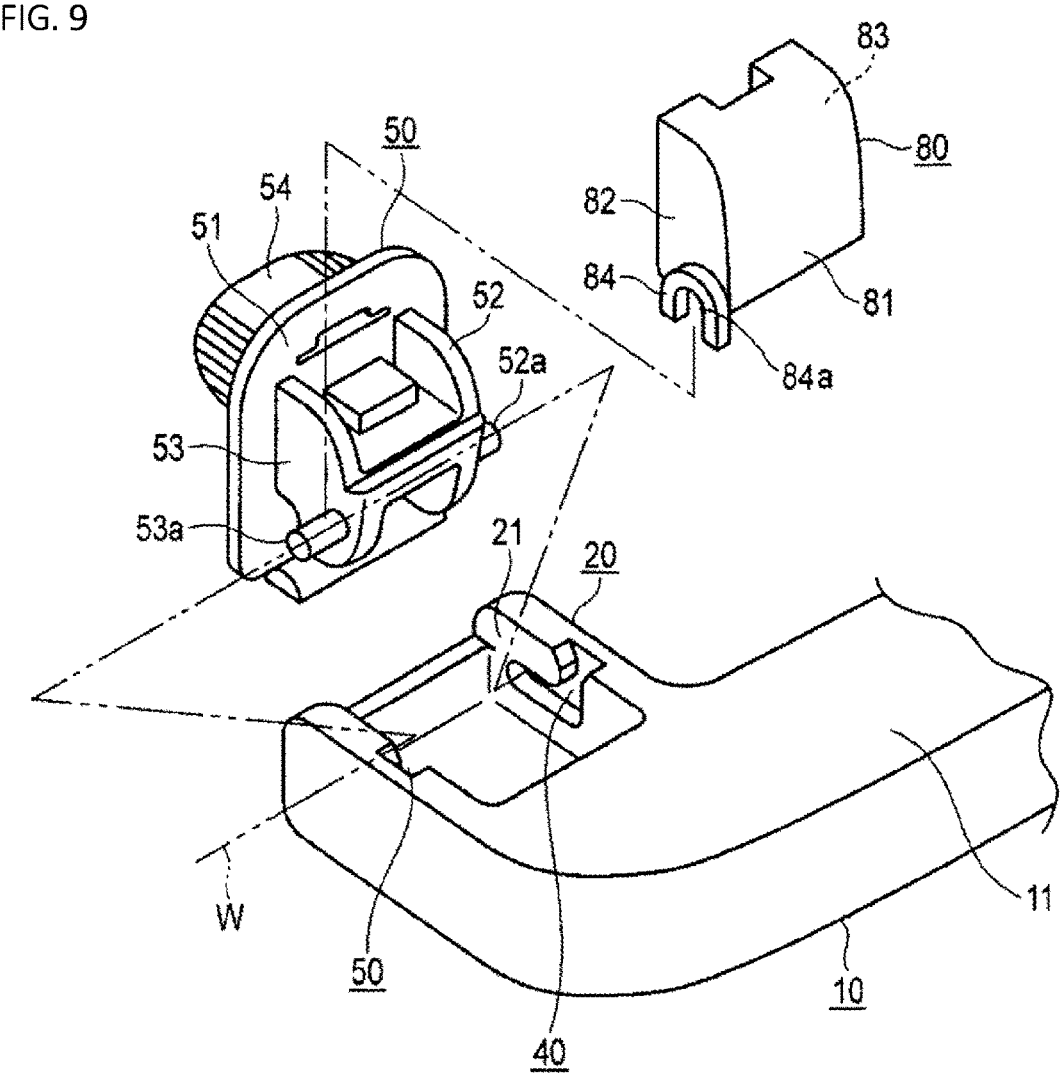
FIG. 9 is a perspective view schematically showing an assembly method of the assist grip.

In the hinge 50, there is detachably provided a cover portion 80 (see FIG. 9). The cover portion 80 is provided with a cover main member 81 attached to the hinge main member 51. In the longitudinal direction W of the cover main member 81, there are provided wall members 82 and 83, and from one wall member 82, there is provided a stopper member 84 extending to a round boss portion 53a side. At a tip of the stopper member 84, there is provided a semicircular (approximately U-shaped) engagement portion 84a along an outer periphery of the round boss portions 52a and 53a. The engagement portion 84a is fixed by engaging the outer periphery of the round boss portion 53a, and sandwiched between the upright portion 53 and an inner wall face of the concave portion 21 to control a movement of the hinge main member 51 in the longitudinal direction W. Therefore, the round boss portions 52a and 53a can be prevented from slipping out of the groove portions 30 and 40.

The assist grip 10 formed in the aforementioned manner is assembled as follows. Incidentally, FIG. 9 is a perspective view schematically showing an assembly method of the assist grip 10. At first, the damper 60 is disposed between the upright portions 52 and 53. Then, the round boss portions 52a and 53a of the hinge 50 are respectively inserted into the first groove 31 of the groove portion 30 and the first groove of the groove portion 40. The groove portion 40 has a sufficient depth so as to allow the round boss portions 52a and 53a to be easily inserted without bending the upright portions 52 and 53.

Next, the round boss portions 52a and 53a of the hinge 50 are moved along the second groove 32 and the second groove 42 to be moved up to respective terminal portions. Then, the round boss portion 52a of the hinge 50 is moved in the longitudinal direction W in such a way as to be dropped into the bearing concave portion 33. Thereby, an outer peripheral portion of the round boss portion 53a of the hinge 50 is exposed.

Also, a rib 62a provided on an outer periphery of the outer cylinder portion 62 of the damper 60 is engaged with the inner wall face of the concave portion 21.

Next, the engagement portion 84a of the stopper member 84 is engaged with the outer peripheral portion of the round boss portion 53a so as to attach the cover main member 81 as it is to be fixed using a metal clip and the like.

Similarly, the hinge 50 is attached to the other concave portion 21 as well. Incidentally, in the coil spring 70, one end is attached to either of the upright portion 52 or 53, and the other end is attached to the inner wall face of the concave portion 21.

Thus, in the assist grip 10 according to the present embodiment, without bending the upright portions 52 and 53, an insertion operation can be easily carried out. Moreover, the assist grip 10 can be reliably fixed by the stopper member 84, so that an assembly operation can be easily carried out. Also, without lowering rigidity of the upright portions 52 and 53, durability can be maintained as well.

Also, the depth of the groove portion 30 wherein the bearing concave portion 33 is provided is made shallow, and the depth of the groove portion 40 is made deep, and in a state of rotational shaft insertion, the round boss portion 53a is located inside the groove portion 40 so as to obtain high holding strength by pivotally supporting at the groove portions 30 and 40 on both sides.

The stopper member 84 is integrally formed with the cover portion 80 with respect to the hinge so as to lower the number of components, and reduce operation processes and manufacturing cost.

The round boss portions 52a and 53a protruding from the upright portions 52 and 53 are set as the turning shafts so as to lower the number of components, and reduce the manufacturing cost.

Furthermore, the groove portions 40 having the deep groove portion are provided on the same side of the pair of concave portions 21 in the longitudinal direction W, so that the hinge 50 or the cover member 80 can have the same shape so as to reduce the manufacturing cost.

Incidentally, without integrally forming the round boss portions 52a and 53a with the upright portions 52 and 53 by the same material, a component penetrating the upright portions 52 and 53 such as a metal shaft may be used as the turning shaft. Also, in place of the coil spring 70, a different kind of elastic member such as a leaf spring may be used to urge the assist grip 10.

Incidentally, the present invention is not limited to the aforementioned embodiments, and it is obvious that the embodiments can be variously modified provided that they do not exceed the subject of the present invention.

What is claimed is:

1. An assist grip attached to an inside of a vehicle cabin of an automobile, comprising:
    a grip main member including a first concave portion and a second concave portion formed on two ends in a longitudinal direction, and each concave portion having a corresponding peripheral wall, a first groove portion formed in a first section of each peripheral wall, a second groove portion formed in a second section of each peripheral wall, each of the first and second peripheral sections being opposite each other in the longitudinal direction;
    a first hinge and a second hinge, each hinge including a first upright portion and a second upright portion housed in the corresponding concave portion and separated by a predetermined interval, and each hinge including a first turning shaft and a second turning shaft protruding from two outer sides of the corresponding first and second upright portions and formed to respectively pass through the corresponding first and second groove portions;
    a bearing concave portion provided in each of the first groove portions, an end of each first turning shaft being inserted into a terminal portion of each of the first groove portions; and
    a first stopper member and a second stopper member each having a portion inserted between the corresponding peripheral wall of the corresponding concave portion and the corresponding second upright portion preventing a disconnection of the corresponding first turning shaft from a rotational shaft insertion state wherein the end of each first turning shaft is inserted into the corresponding bearing concave portion.

2. An assist grip according to claim 1, wherein a depth of each first groove portion is shallow, and a depth of each second groove portion is deep, so that each second turning shaft is located inside said corresponding second groove in the rotational shaft insertion state.

3. An assist grip according to claim 1, wherein each stopper member has an approximately U shape, and engages an outer peripheral face of the corresponding second turning shaft.

4. An assist grip according to claim 1, wherein each turning shaft has a round boss shape protruding from the corresponding upright portion.

5. An assist grip according to claim 2, wherein each of the second groove portions is provided on a same side of the corresponding concave portion in the longitudinal direction.

6. An assist grip attached to an inside of a vehicle cabin of an automobile, comprising:
    a grip main member including a first concave portion and a second concave portion formed on two ends in a longitudinal direction, and each concave portion having a corresponding peripheral wall, a first groove portion formed in a first section of each peripheral wall, a second groove portion formed in a second section of each peripheral wall, each first and second peripheral section being opposite each other in the longitudinal direction;
    a first hinge and a second hinge, each hinge including a first upright portion and a second upright portion housed in the corresponding concave portion and separated by a predetermined interval, and each hinge including a first turning shaft and a second turning shaft protruding from two outer sides of the corresponding first and second upright portions and formed to respectively pass through the corresponding first and second groove portions;
    a bearing concave portion provided in each of the first groove portions, an end of each first turning shaft being inserted into the bearing concave portion of each of the first groove portions; and
    a first stopper member and a second stopper member each having a portion inserted between the corresponding peripheral wall of the corresponding concave portion and the corresponding second upright portion preventing a disconnection of the corresponding first turning shaft from a rotational shaft insertion state wherein the end of each first turning shaft is inserted into the corresponding bearing concave portion,
    wherein each stopper member is integrally formed with a corresponding cover portion with respect to the corresponding hinge.

* * * * *